Figure 1:
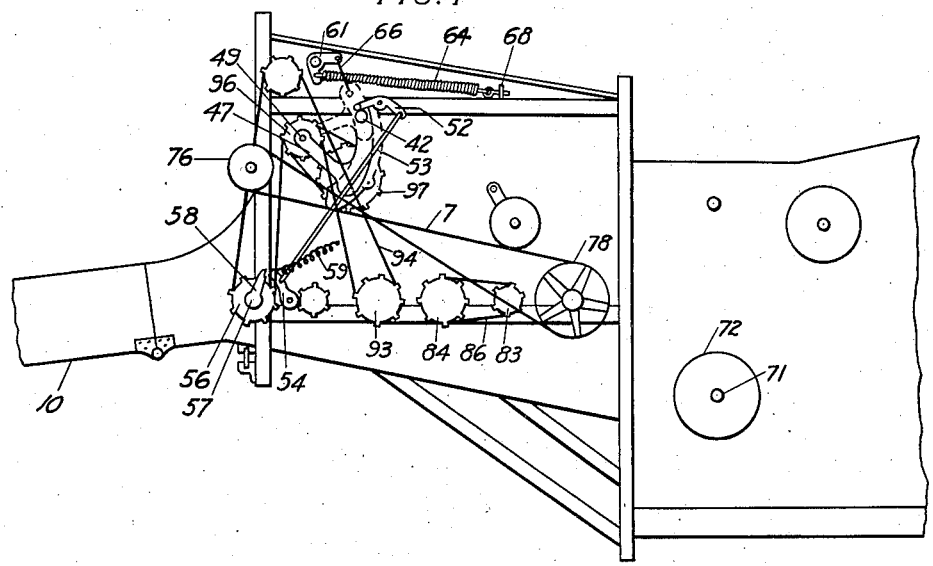

March 21, 1939.  F. L. KILBERGER  2,150,976
THRESHING MACHINE
Filed June 3, 1936  2 Sheets-Sheet 1

INVENTOR.
FRANK L. KILBERGER
BY
Flournoy Corey
ATTORNEY.

March 21, 1939.  F. L. KILBERGER  2,150,976
THRESHING MACHINE
Filed June 3, 1936  2 Sheets-Sheet 2

INVENTOR.
FRANK L. KILBERGER
BY Flournoy Corey
ATTORNEY.

Patented Mar. 21, 1939

2,150,976

UNITED STATES PATENT OFFICE 2,150,976

THRESHING MACHINE

Frank L. Kilberger, Cedar Rapids, Iowa

Application June 3, 1936, Serial No. 83,338

5 Claims. (Cl. 130—1)

My invention relates to threshing machines and has particular relation to the mechanism employed for receiving the bound bundles or sheaves of grain, severing the twine binding the bundles and feeding the grain into the separating mechanism of the threshing machine.

Devices of this nature made according to the teachings of the prior art have had several defects. I have observed that the efficiency of the separating mechanism of the threshing machine is increased if the grain from the bundles is separated or spread evenly in the feeding mechanism and if the grain from the bundles is fed into the threshing mechanism or threshing cylinder in such a way that the heads of the grain will not be covered by the stalks. This action exposes the grain to the direct action of the threshing cylinder and increases the efficiency of separation of the grain from the stalks.

In the usual feeding mechanism of the ordinary type the grain is not dispersed properly or evenly so that the grain leaving the feeding mechanism and going into the threshing mechanism varies in quantity and uniformity of flow.

Also in the usual feeding mechanism the grain from the bundles is agitated violently with the result that the straw is broken up into fine particles and is consequently difficult to handle. This is especially true if the grain is very dry at the time of threshing.

In many cases no provision was made for taking care of overload in the threshing machine and if too many bundles of grain were fed into the machine then the efficiency of the separating mechanism was greatly reduced and the grain was not properly threshed.

It is accordingly an object of my invention to provide an improved mechanism for feeding grain into the separating mechanism of a threshing machine.

Another object of my invention is to provide a feeding mechanism for a threshing machine which will insure that the grain from the sheaves will be dispersed after the bands are cut and will be fed into the separating mechanism in a fixed manner rather than haphazardly.

Another object of my invention is to insure the feeding of the grain so that the straw will not be broken up into fine particles but will be more or less intact after the grain is separated therefrom.

Another object of my invention is to provide a feeding mechanism for a threshing machine that will insure that the grain will be passed through the machine in such quantities that the machine will not be overloaded.

A further object of my invention is to provide a feeding mechanism for a threshing machine in which the flow of grain through the feeding mechanism will be regulated as to insure that the heads of the grain stalks going into the threshing mechanism will be exposed directly to the action of the threshing cylinder.

Figure 2:
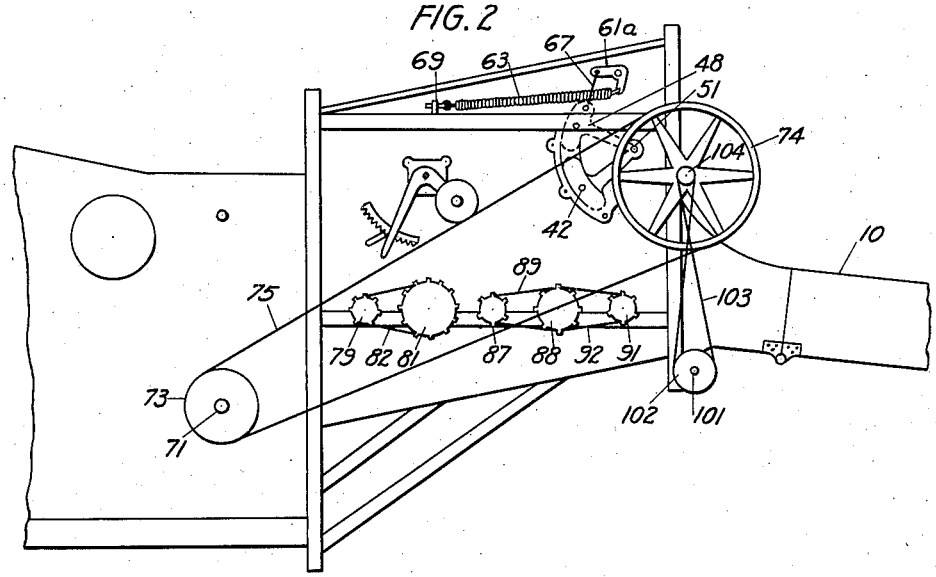
Figure 3:
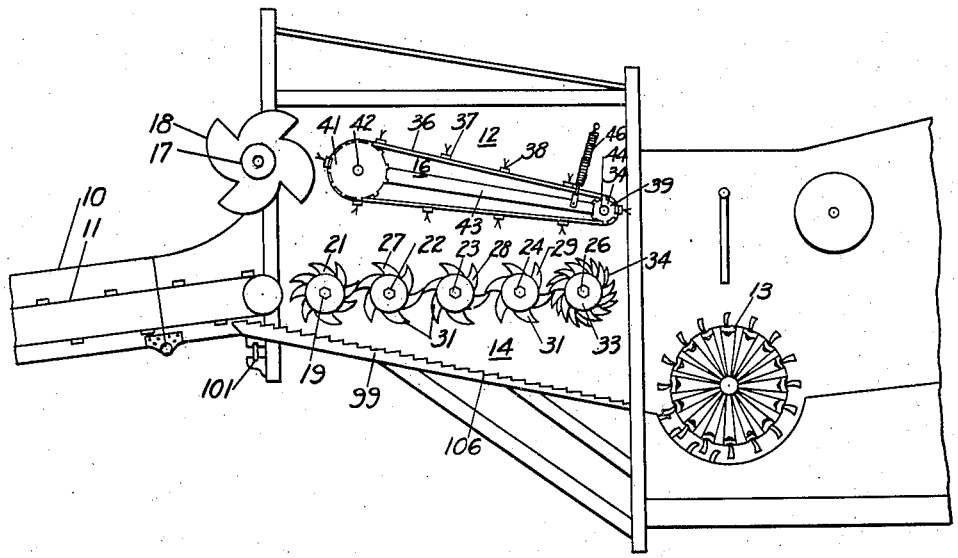
Figure 4:
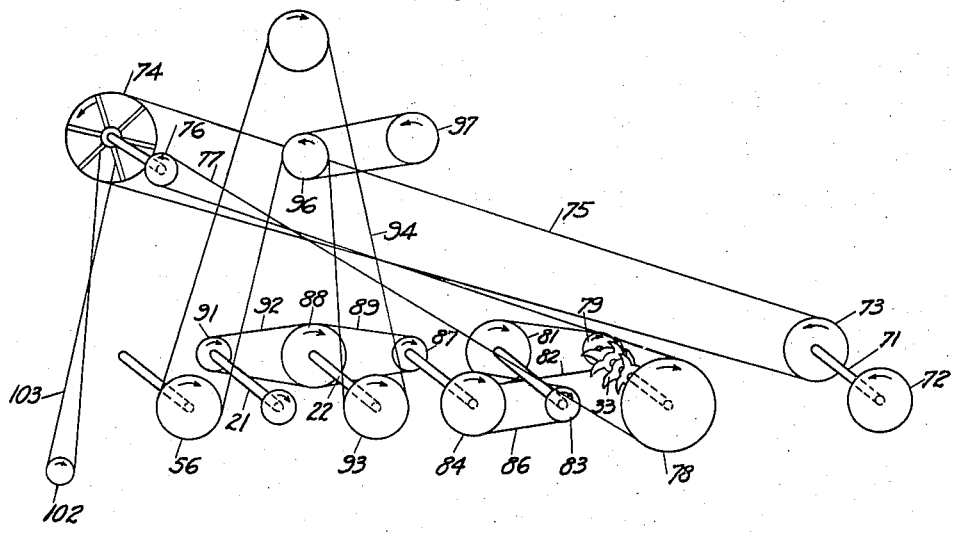

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1 is a view in side elevation of a feeding mechanism constructed in accordance with the principles of my invention and showing part of the driving system and the mechanism for prevention of overloading, Figure 2 is a view in side elevation of the side opposite that shown in Figure 1, showing the remainder of the driving system, Figure 3 is a sectional view on a vertical plane through the center of a feeding mechanism for a threshing machine constructed in accordance with the principles of my invention, and Figure 4 is a diagrammatic view of the feeding mechanism shown in Figures 1, 2 and 3 and shows the driving system thereof.

Referring now to the drawings and particularly to Figure 3, the device there shown includes a loading chute 10 having an endless conveyor belt 11 which is constructed in accordance with the usual practice well known in the art.

The conveyor belt 11 is adapted to carry bundles of grain thrown into the chute 10 into the feeding mechanism indicated generally at 12. As the sheaves of grain enter into the feeding mechanism the twine, binding the bundles, is cut and the grain dispersed and is finally fed into the threshing cylinder 13 and the rest of the separating mechanism (not shown) of the threshing machine in accordance with the usual practice.

My invention is concerned with the feeding mechanism indicated generally at 12 and consequently the remaining structure of the threshing machine will not be discussed except insofar as it enters into the explanation of my device.

The feeding mechanism, indicated at 12, includes a series of rollers, indicated generally at 14, hereinafter more particularly described and comprising a lower carrier unit. An upper carrier or rake unit, indicated at 16, operates cooperatively with the lower carrier unit to provide the mechanism for feeding the grain into the threshing cylinder 13 of the machine.

Properly spaced above the discharge end of the conveyor belt 11 is a roller 17 having a series of circular four bladed cutting knives 18 spaced at fixed intervals along the length of the roller 17. These knives serve to sever the twine binding the sheaves of grain as the sheaves enter the feeding mechanism. To insure that the binder of any sheave in entering into the feeder will be cut, a roller 19 having a series of four bladed cutters 21 spaced along its length is employed immediately adjacent the discharge end of the conveyor belt 11. Thus, if the bundles of grain entering the feeder become stacked one upon another, the upper band cutter 17 will sever the twine of the upper bundle and the lower band cutter 19 will cut the twine of the lower bundle.

The lower carrier unit, indicated generally at 14, comprises rollers 19, 22, 23, 24 and 26. Roller 19 is the band cutting roller as previously described. The rollers 22, 23, and 24 may be termed the spreader rollers and are designed to disperse and spread the grain from cut bundles to provide even flow of the grain. The rollers 22, 23 and 24 have a series of blade-like circular members 27, 28 and 29 spaced along their length. The members 27, 28 and 29 are constructed with six extending teeth, as indicated at 31. The blades 27, 28 and 29 are mounted on the adjacent rollers 22, 23 and 24 in alternated position and in sufficient numbers to insure that the grain passing over the rollers will be separated out evenly.

Roller 26, which may be termed the retarding roller, includes a series of spaced blade members 33 each of which has three teeth 34. The blade members 33 are closely spaced along the length of roller 26 and the rotative speed of the roller is so regulated as to give a combing action on the grain passing thereover to provide even flow into the threshing cylinder.

Above the lower carrier unit 14 and adapted to work cooperatively with lower unit 14 is an upper carrier or rake unit, indicated generally at 16. The rake unit 16 includes an endless chain 36 having cross bars 37 attached thereon. The cross bars 37 are arranged with steel pegs 38 suitably spaced along their length to thus provide the rake effect. The endless chain 36 and cross members 37 travel over idler sprockets 39 and are actuated by sprockets 41 on shaft 42. Frame member 43 slidingly engaged on the shaft 42 and shaft 44 hold the sprocket members 39 and 42 in fixed spaced relationship.

The rake unit 16 is supported in position at one end by spring members 46 and at the other end by shaft 42 rotatably engaged in rocker arms 47 and 48 (Figures 1 and 2) on opposite sides of the feeder assembly. The rocker arms 47 and 48 are in turn rotatably mounted on shaft 49 and 51. The manner of mounting the rake unit 16 provides for vertical movement of the unit 16. The vertical movement thus obtained enables the control of the amount of grain fed through the device as now described.

As the amount of grain entering the feeding mechanism is increased, the unit 16 will be gradually forced to its furthest upward position. A pivotally mounted lever arm 52 has one portion thereof in the path taken by the shaft 42 of the assembly 16 as it moves upwardly. A rod 53, adjustable as to length, is secured at one end in the other portion of the lever 52 and extends downwardly to and is secured at the other end to a small dog 54. The conveyor belt 11 is driven by a sprocket 56 having a slip-clutch mechanism 57 cooperatively engaged therewith. A lever arm 58 on the slip-clutch 57, if engaged with the dog 54, actuates the clutch mechanism to stop the travel of the conveyor belt 11. The dog 54 is normally held out of engagement with the arm 58 by a spring 59.

It is obvious that as the rake assembly 16 is forced toward its upward position that the shaft 42 thereof will encounter the lever 52 and as the travel continues will cause rod 53 to force the dog 54 into engagement with lever 57 against the action of spring 59. The flow of bundled grain into the feeder 12 will thus be checked and the grain in the feeding unit will continue on through to the threshing cylinder 13 until the pressure against the unit 16 is decreased sufficiently to allow the unit to drop to thus cause the disengagement of the dog 54 with lever 57 by reason of the action of spring 59. This action permits renewal of travel of the conveyor belt 11 to furnish more grain to the feeder.

In addition to the aforedescribed device for regulating the flow of grain there is a speed governor (not shown) of any type well known in the art for regulating the speed of the drive of the feeding mechanism.

A balancing mechanism is provided for the unit 16 comprising rocking arms 61 and 61a having one portion thereof secured to springs 63 and 64 and the other portion secured to the rocker arms 47 and 48 by means of wires or cables 66 and 67. The amount of weight of the rake unit 16 supported by the balancing devices thus described may be regulated by the amount of tension imposed by the springs 64 and 63 as adjusted through the agency of bolts 68 and 69.

The efficiency and operative improvement of my feeding device is in a great measure obtained by the regulation and relationship of rotating speeds of the various rollers of the carrier assembly 14 and of the upper rake unit 16.

The drive is so arranged that the rotating speeds of the rollers 22, 23, 24 and 26 of the lower carrier unit successively increase from the intake side to the outlet side of the device.

The upper rake unit 16 travels more slowly than any of the lower rollers. It may readily be seen that as the sheaves of grain travel through the feeder the upper portion of the bundles or that adjacent the upper carrier or rake unit 16 will be retarded because of the slower speed of the upper unit 16 with respect to the lower unit 14. The increasing rotative speed of the rollers of the lower unit 14 and the retarding effect of the upper unit 16 insure that the bottom portion of the bundled grain will be fed into the threshing cylinder.

The band cutting rollers 17 and 19 necessarily rotate more rapidly than the other rollers in order to give proper cutting action.

The drive of the feeding device operates as follows. A main drive shaft for the entire threshing machine is indicated at 71, Figures 1, 2 and 4. A pulley 72 is mounted on one end of the shaft and may be operatively engaged by a belt (not shown) to a prime mover. Another pulley 73 is located on the other end of the shaft and is operatively connected by a belt 75 to a large pulley 74 that is engaged on one end of the upper band cutter roller 17. A pulley 76 on the other end of the roller 17 is operatively connected by a crossed belt 77 to a pulley 78 mounted on the shaft of the retarder roller 26. A sprocket 79 on the other end of the roller 26 drives a sprocket 81 on the spreader roller 24 by means of a chain 82. Sprocket 83 on the opposite end of roller 24 in turn drives sprocket 84 by means of a chain 86. On the opposite end of roller 23 is a sprocket 87 that drives a double sprocket 88 on roller 22 by means of chain 89, thus operating roller 22 and in turn roller 21 by means of sprocket 91 and chain 92.

A sprocket 93 on the opposite end of roller 22, through the agency of chain 94, drives the upper rake unit through sprockets 96 and 97 and also the conveyor 11 through the agency of sprocket 56.

It is obvious that the sizes of the various pulleys and sprockets thus described may be chosen to give any desired operating speeds for the various rollers and units.

Below the lower carrier unit 14 is located an agitator assembly or pan 99. The agitator 99 is slidably mounted in the lower framework of the feeder unit and is driven by an eccentric shaft, indicated at 101, to provide a shaking movement. The agitator shaft 101 is driven by pulley 102 operatively connected by a cross belt 103 to a pulley 104 on the band cutter 17. The agitator pan is constructed with a series of steps or ribs 106 and is designed to catch any loose grain or straw that falls through the carrier units 14. The grain or straw will finally be discharged from the agitator 99 into the threshing cylinder 13.

Although I have shown and described certain specific embodiments of my invention I am fully aware that many modifications thereof are possible. My invention, therefore, is not to be restricted except insofar as is necessitated by the prior art and by the spirit of the appended claims.

I claim as my invention:

1. A feeding device for a threshing machine including a conveyor for carrying bundles into the thresher, twine cutting rollers disposed above and below the discharge end of the bundle conveyor, spreader rollers having circular blade-like members disposed below the grain to receive the grain from the conveyor and cutting rollers and to carry it into the machine and to comb it, means for rotating successive rollers at successively higher speeds to cause the bottoms of the layer of grain to move faster than the top, and a retarding roller for combing the grain after it is discharged from the spreader rollers.

2. A feeding device for a threshing machine including a conveyor for carrying bundles into the thresher, twine cutting rollers disposed above and below the discharge end of the bundle conveyor, spreader rollers having circular blade-like members disposed below the grain to receive the grain from the conveyor and cutting rollers and to carry it into the machine and to comb it, means for rotating successive spreader rollers at successively higher speeds to cause the bottoms of the layer of grain to move faster than the top, and a retarding roller for combing the grain after it is discharged from the spreader rollers, a rake unit of conveyor form supported above the spreader rollers, springs supporting one end of the rake unit, and rocker arms for supporting the other end of the rake unit to permit the rake unit to "float" on top of the bundles as they enter the machine.

3. A feeding device for a threshing machine including a means for carrying bundles into the thresher, band cutters for cutting the bands of the bundles as they are discharged from the conveying means, rollers within the machine to receive, support and advance the bundles after the bands have been cut, and means for rotating the rollers at successively higher speeds whereby the bottoms of the bundles move faster than the tops, the rollers having circular blade-like members for combing and shaking and advancing the grain, a retarder roller positioned to receive the grain after it passes over the spreader rollers and having circular blade-like members for combing the grain, and an upper rake unit positioned above the rollers for assisting in carrying grain into the threshing machine, the rake unit being rotated at slower speeds than the rollers to retard the tops of the bundles.

4. A feeding device for a threshing machine including a conveyor for carrying bundles into the thresher, a roller having cutting blades for cutting the bands of the bundles, spreader rollers having blade-like members for receiving, supporting and advancing the grain discharged from the conveyor, the successive spreader rollers being rotated at successively higher speeds to advance the bottom of the bundles faster than the top, and a retarding roller to comb the grain after it is discharged from the spreader rollers.

5. A feeding device for a threshing machine including means for conveying bundles into the thresher, rotary cutters for cutting the bands on the bundles, roller means for conveying the grain into the thresher, a rake unit of conveyor form above the rollers, springs for supporting one end of the rake unit within the thresher, rocker arms pivotally mounted within the thresher for supporting the other end of the rake unit, a bell crank and spring for assisting in supporting the weight of the rocker arms and the conveyor, a lever adapted to be struck by one of the rocker arms in its arc of travel, and means for disengaging the bundle conveyor drive operatively engaged to the last named lever.

FRANK L. KILBERGER.